United States Patent [19]

Brookins et al.

[11] 3,770,130
[45] Nov. 6, 1973

[54] RECIRCULATING FILTER APPARATUS

[75] Inventors: Richard H. Brookins, Pomona; John Paul Miller, Garden Grove, both of Calif.

[73] Assignee: Brown International Corporation, Covina, Calif.

[22] Filed: July 14, 1972

[21] Appl. No.: 272,052

[52] U.S. Cl. ................. 210/305, 210/313, 210/414, 210/433
[51] Int. Cl. ............................................ B01d 29/42
[58] Field of Search .................... 210/298, 299, 305, 210/306, 311–313, 405, 413–416, 433, 434

[56] References Cited
UNITED STATES PATENTS

| | | | |
|---|---|---|---|
| 1,468,906 | 9/1923 | Inman | 210/306 |
| 2,682,811 | 7/1954 | Infanger | 210/414 X |
| 3,507,392 | 4/1970 | Alexander et al. | 210/415 X |

*Primary Examiner*—John Adee
*Attorney*—Charles G. Lyon et al.

[57] ABSTRACT

A power filter assembly including a rotary impeller positioned adjacent a filter screen is mounted in an upright tubular member. The tubular member is positioned concentrically within a settling tank. The lower end of the tubular member is open and communicates with the annular space between the tubular member and the tank wall. Inlet fluid to be filtered passes directly into the tubular member above its open lower end and mixes with fluid drawn from the annular space. Filter liquid is discharged through an outlet above the power filter assembly. Ports in the side wall of the tubular member opposite the impeller discharge fluid radially into said annular space. Baffle means in the annular space prevent centrifugal motion of the fluid to promote settling of oversize solids into the conical lower end of the settling tank which is provided with a valved discharge opening.

8 Claims, 1 Drawing Figure

PATENTED NOV 6 1973　　3,770,130
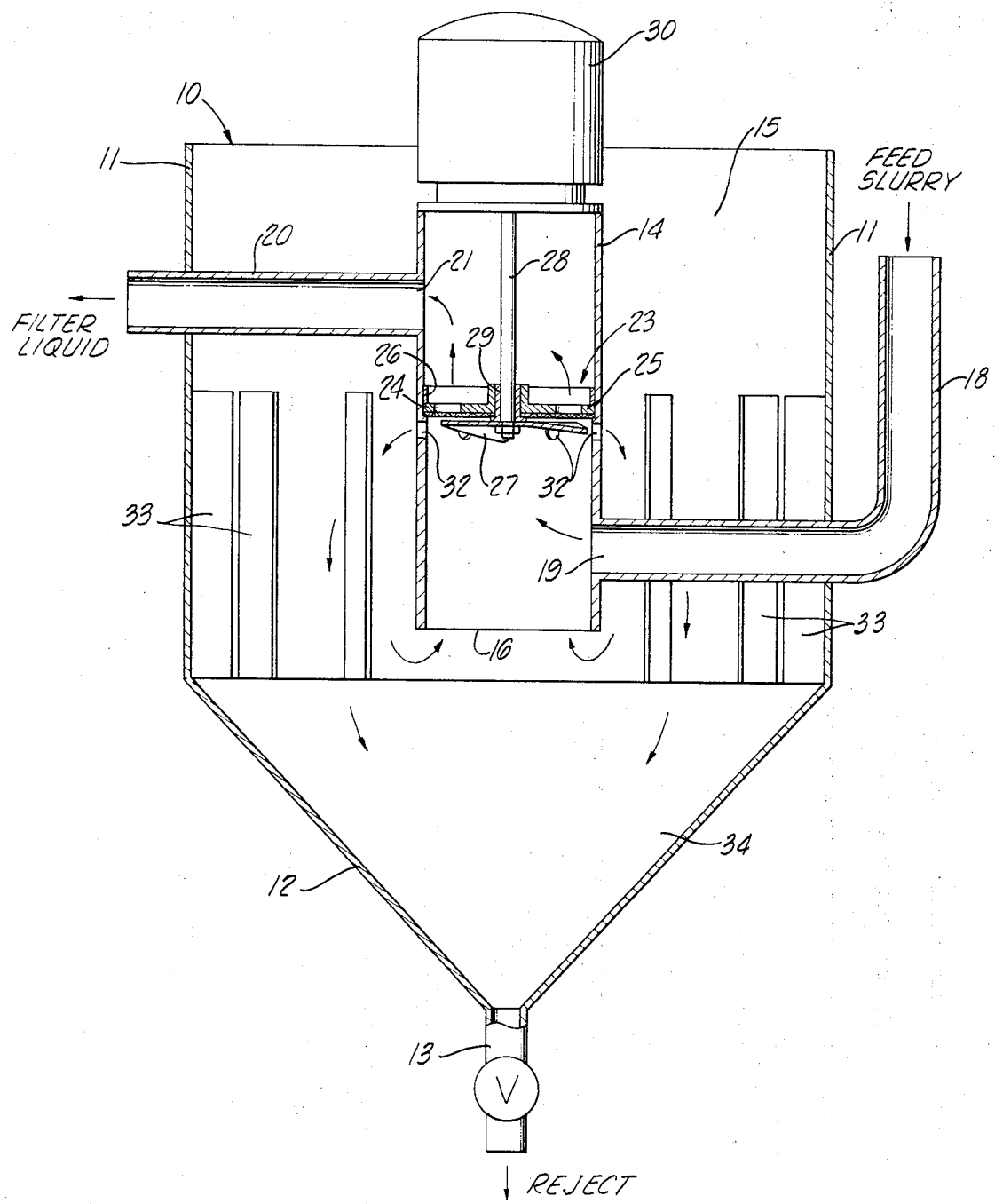

RECIRCULATING FILTER APPARATUS

This invention relates to apparatus for filtering fluids and is particularly directed to recirculating filter apparatus combined with a settling tank. Power filters of conventional type employ a rotary impeller adjacent a screen, but the swirling motion of the fluid caused by the rotating impeller interferes with settling action of oversize solids. The present invention employs a power driven impeller adjacent a filter screen, but the impeller not only serves to drive fluid through the filter screen but also moves it radially outward through ports in an enclosing tubular member and into an annular settling chamber. Baffles are provided in the settling chamber so that centrifugal motion of the fluid is prevented and thereby settling of oversize solids occurs into the lower part of the tank. Moreover, the fluids acted on by the impeller include the inlet fluid to be filtered mixed with quiescent fluid drawn from the annular space from which oversize solids have settled. Accordingly, the impeller and filter screen operate in a dilute fluid medium.

Other and more detailed objects and advantages will appear hereinafter.

The drawing comprises a sectional elevation showing a preferred embodiment of this invention.

Referring to the drawing, the settling tank generally designated 10 has an upright cylindrical sid wall 11 and a bottom tapered wall 12 converging downward to a valved discharge 13. A tubular member 14, cylindrical in form, is mounted concentrically within the cylindrical side wall 11 to define an annular space or chamber 15 therebetween. The lower end 16 of the tubular member 14 is open and communicates with the annular space 15. An inlet pipe 18 extends through the side wall 11 and across the annular space and communicates through inlet port 19 with the interior of the tubular member 14. The inlet port 19 is near the lower open end 16 of the tubular member 14. An outlet pipe 20 extends from outlet port 21 across the annular space 15 and through the side wall 11. The level of the outlet port 21 is above the level of the inlet port 19.

A power filter assembly generally designated 23 includes a filter screen 24 and a back-up plate 25 both extending across the interior of the tubular member 14 and anchored in place by a retainer ring 26. A rotary bladed impeller 27 is mounted adjacent the filter screen 24 and is carried on the lower end of a shaft 28 mounted in bearing 29 on the back-up plate 25. The shaft is driven by the motor 30 mounted above the tubular member 14.

A circumferential series of radial ports 32 are provided in the tubular member 14 adjacent the impeller 27. Turning movement of the impeller 27 drives a portion of the fluid through the filter screen 24 and out through the discharge pipe 20, and also drives fluid radially outward through the ports 32 and into the annular chamber 15. Centrifugal motion of fluid in the annular chamber 15 is prevented by means of a series of radial baffle plates 33 fixed to the side wall 11 and extending into the annular chamber 15.

In operation, fluid to be filtered, such as a feed slurry, is admitted through inlet pipe 18 and passes through port 19 directly into the interior of the tubular member 14. This feed slurry is mixed with quiescent fluid drawn from the annular chamber 15 into the tubular member 14 through its open lower end 16. This fluid mixture is more dilute than the feed slurry itself because oversize solids have settled out of the annular chamber 15 into the lower collection chamber 34 defined within the tapered bottom wall 12.

The apparatus operates continuously with feed slurry entering the inlet pipe 18 and filtered liquid passing from the outlet pipe 20, and oversize solids passing outward through the valved discharge 13.

Having fully described our invention, it is to be understood that we are not to be limited to the details herein set forth but that our invention is of the full scope of the appended claims.

We claim:

1. Recirculating filter apparatus comprising in combination: a settling tank having an upright cylindrical side wall, a tubular member mounted concentrically within the cylindrical wall to define an annular chamber, the tubular member having an open lower end communicating with said annular chamber, fluid inlet means communicating with the interior of the tubular member above its open lower end, fluid outlet means above the fluid inlet means and extending from the interior of the tubular member, a power filter assembly mounted within the tubular member between the inlet means and the outlet means, said assembly including a filter screen extending across the tubular member and an impeller mounted to rotate within the tubular member adjacent the filter screen, said tubular member having ports in the wall thereof radially outward of the impeller whereby turning of the impeller drives fluid axially through the filter screen and also drives fluid radially outward through said ports into said annular chamber, baffle means within the annular chamber acting to prevent centrifugal motion of fluid therein and thereby promote settling of oversize solids into the lower part of the tank.

2. The combination set forth in claim 1 in which the inlet means and the outlet means each comprise a pipe extending across the annular chamber and through the side wall.

3. The combination set forth in claim 1 in which power means above the tubular member turn the impeller by means of a shaft extending through the filter screen.

4. The combination set forth in claim 1 in which the settling tank includes a bottom tapered wall converging downward, and a valved discharge port at the lower end of the bottom wall.

5. The combination set forth in claim 1 in which said baffle means comprises a circumferential series of baffle plates secured to the side wall of the tank.

6. Recirculating filter apparatus of the type described, comprising in combination: a settling tank having an upright cylindrical side wall and a bottom tapered wall converging downward, tubular member mounted concentrically within the cylindrical wall to define an annular chamber, the tubular member having an open lower end communicating with said annular chamber, an inlet pipe extending through the side wall and across said annular chamber and communicating with the interior of the tubular member near its open lower end, an outlet pipe above the inlet pipe and extending from the interior of the tubular member across said annular chamber and through the side wall, a power filter assembly mounted within the tubular member between the inlet pipe and the outlet pipe, said assembly including a filter screen extending across the tubular member and a bladed impeller mounted to rotate within the tubular member adjacent the filter screen, said tubular member having ports in the wall thereof radially outward of the bladed impeller whereby turning of the impeller may drive a filter medium axially through the filter screen and into the outlet pipe and also drive a filter medium radially outward through said ports into said annular chamber, baffles on the side wall within the annular chamber acting to prevent centrifugal motion of the filter medium and thereby promote settling of oversize solids into the tank bottom and to permit the power filter assembly to operate in a dilute filter medium.

7. The combination set forth in claim 6 in which power means above the tubular member turn the impeller by means of a shaft extending through the filter screen.

8. The combination set forth in claim 7 in which a valved discharge port is provided at the lower end of the bottom wall.

* * * * *